Dec. 26, 1922.
A. H. BRANDON.
FISHING TOOL.
FILED JAN. 17, 1920.
1,439,687.
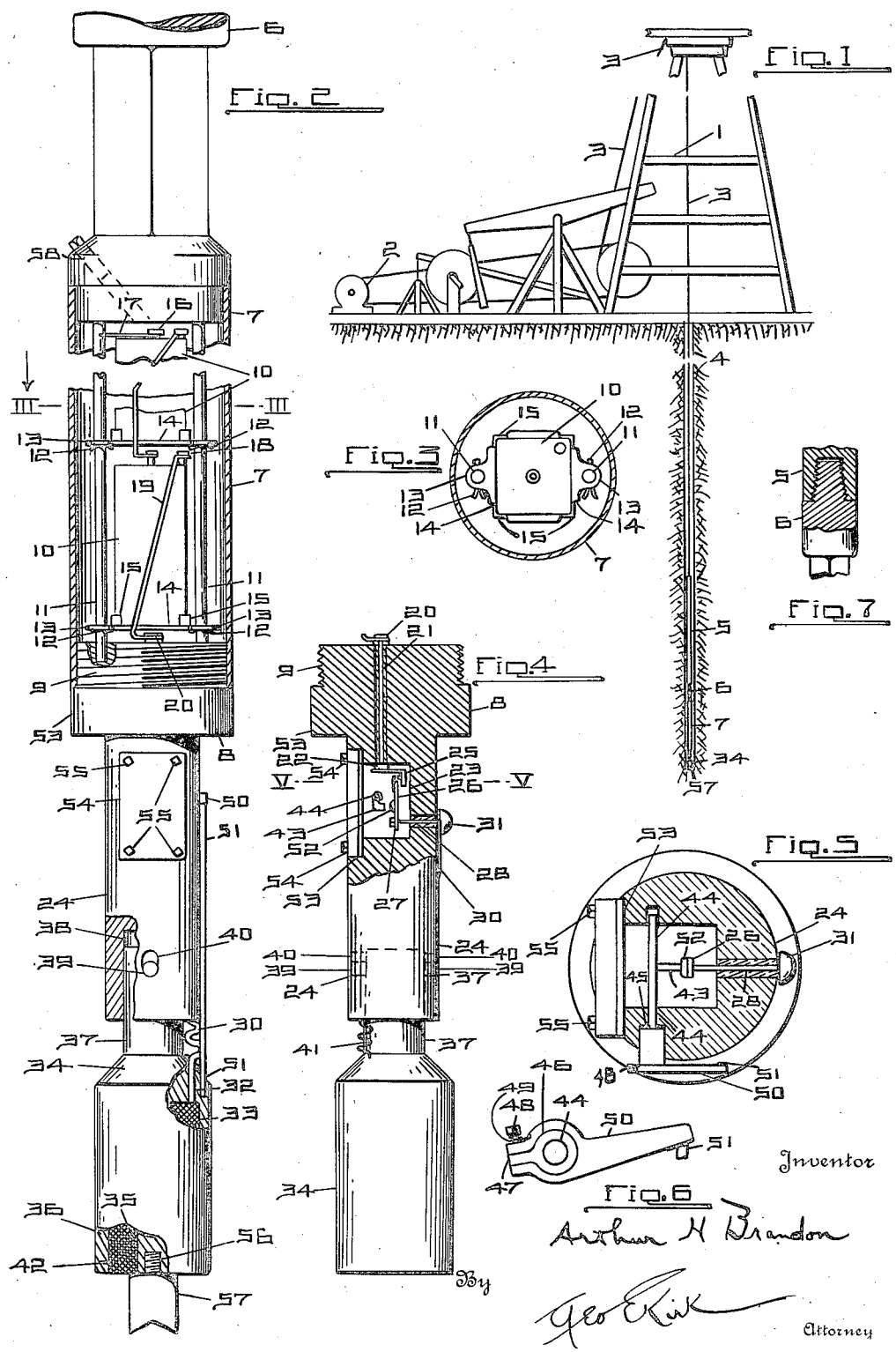

Patented Dec. 26, 1922.

1,439,687

UNITED STATES PATENT OFFICE.

ARTHUR H. BRANDON, OF TOLEDO, OHIO, ASSIGNOR, BY MESNE ASSIGNMENTS, TO THE DEEP WELL ENGINEERING COMPANY, OF TOLEDO, OHIO, A CORPORATION OF OHIO.

FISHING TOOL.

Application filed January 17, 1920. Serial No. 352,084.

*To all whom it may concern:*

Be it known that I, ARTHUR H. BRANDON, a citizen of the United States of America, residing at Toledo, Lucas County, Ohio, have invented new and useful Fishing Tools, of which the following is a specification.

This invention relates to fishing tools for wells.

This invention has utility when incorporated in electromagnetic tools, especially for carrying a battery as a self energizing unit to be attached to a drilling stem.

Referring to the drawings:

Fig. 1 is a fragmentary view of a drilling rig in position with the fishing tool of the invention herein connected thereto;

Fig. 2 is an enlarged view, with parts broken away, of the tool, with a single pole extension attachment having a V-terminus of especial utility for engaging types of under reamer cutters;

Fig. 3 is a section on the line III—III, Fig. 2;

Fig. 4 is a view of the enclosed switch and connections therefrom;

Fig. 5 is a section on the line V—V, Fig. 4;

Fig. 6 is a detail view of throw-off arm, which may be set so that the magnet may not throw the switch; and Fig. 7 is a detail of the connection of the tool to the stem.

A drilling rig derrick 1 is shown as having power for drilling operations supplied by motor 2. Drilling line 3 extends through the derrick 1, into well 4 to drilling stem 5 having a tapered threaded opening in its lower end. Instead of engaging a bit, there is shown herein a threaded head 6 rigid with a casing 7 of the fishing tool herein.

The tool is herein shown as comprising a base member 8 having an upper threaded portion 9 detachably connected to the casing 7, said casing providing a housing for battery cells 10, which are preferably of a very thin plate storage battery type, occupying small space for large amperage output. The member 8 has anchored therein a pair of rods 11 through which may be inserted split keys 12 to sustain ears 13 of shelves 14 having flanges 15 rising therefrom to hold the cell or cells 10 thereon from shifting.

The cells 10 are connected in series with an end terminal 16 connected by line 17 to ground with a rod 11. The other end terminal 18 is connected by conductor line 19 with terminal 20 insulated from the member 8. The terminal 20 is connected by lead 21, insulated from the member 8, to terminal 22 in recess 23 of downward extension 24 integral with member 8. This terminal 22 has a non-arcing carbon arm 25 against which may be shifted spring arm 26 mounted on terminal 27 in the recess 23. From this recess 23, and connected to the terminal 27 extends conductor lead 28. This conductor lead 28 has flexible conductor 30 connected thereto. An insulation coating 31 is provided for the lead 28.

The conductor 30 extends through opening 32 to coil 33 of electromagnet 34 having inner or central pole 35 and outer concentric pole 36. Cylindrical extension 37 upward from the electromagnet 34 enters recess 38 in the portion 24 of the base member. Pin 39 through the extension 37 projects into slots 40 of the portion 24, so that the electromagnet 34 and base member 8, 24, may have some relative movement axially. A coil 41 of bare wire is anchored in the magnet 34 and the member 24 for insuring a good grounded circuit to grounded end 42 of the magnet coil 33 from the ground conductor 17 of the battery. Initially this wire 41 may be superfluous, but in the use of the tool herein exposed to the elements and subjected to submergence to great depths in salt, oil and other liquids, corrosive action or coatings may impair the conductivity of the sliding joint between the magnet and the mounting or main member of the housing, as well as possibly cause dangerous arcing therein. Such arcing would be most hazardous in gas and oil well work, as a possible source of fire.

In the recess 23, is arm 43 on rock shaft 44, having high pressure resisting packing joint 45 in its extension to the outside of the member 24. The outer end of the shaft 44 has mounted thereon a collar 46 having an ear 47 through which extends pin 48 having torsion spring 49 normally throwing arm 50 on the pin 48 as an axis, to lie in position close to the side of the member 24. Anchored in the magnet 34 and extending upward therefrom along the side of the member 24 is bar 51 of such a length that when the member 8, 24, moves toward the magnet 34, as permitted by slots 40, the rigid bar 51 may normally engage the free end of the arm 50 to move such upward, thereby rocking the shaft 44 to throw its arm 43 in the recess 23 against insulation block 52 for moving the spring arm 26 against terminal 25. Accordingly in lowering the electromagnet 34, when its travel is stopped or is at a less rate than the travel rate of the magnet positioning or directing means positively controlling the housing and mounting members 6, 7, 8, 24, there is a movement of the magnet relative to the member 24 resulting in a closing of the switch 25, 26, enclosed in the recess 23. The electromagnet 34 is at once energized by this automatic action, and the many ampere turns effective from the two poles generate a strong magnetic field beyond the lower end of the magnet for closing the magnetic circuit beyond the magnet when lost iron or steel parts are drawn thereto.

The sealing of the recess 23, not only encloses the switch against corrosive action on the terminals, but houses any possible spark against ignition action. This recess 23 is filled with transformer oil, gasket 53 is placed in position over the opening, closure plate 54 is then firmly mounted in position by bolts 55.

For penetrative grappling, or engaging of small articles, attachments or extensions of special form add to the utility of this self-energizing fishing tool. In Fig. 2, by threaded stud 56 a V-mouthed attachment 57 is shown, which does most acceptable service in picking up under reamer cutters. These parts are small, and the single pole is usually of sufficient strength to hold the piece centrally of the hole for withdrawal, instead of a hole clogging or rubbing position as might be the case were the object drawn directly against the bottom of the magnet by the action of both poles thereon. Furthermore, the general form of the cutter more readily shifts for larger area of abutting engagement in coacting with the attachment 57.

When the ascent of the magnet from the hole or well is started, the switch 25, 26, remains closed, due to the frictional shoulder holding of the packing 45 being stronger than the spring action of the arm 26. When the magnet with the recovered part is out of the well, the operator may pull the arm 50 down and thus simply release the object from the magnet.

In practice it is usual to store the electromagnetic fishing tool by standing it on end. Such position is also desirable for the batteries, when storage cells are used. With the magnet 34 resting on the floor, there is normally a closing of the switch for energizing the electromagnet and running down the batteries. As a safeguard against such mishap, torsion spring 49 permits swinging of the arm 50 away from the member 24, thus allowing the pin or bar 51 to ride or slide past the arm 50 without rocking the shaft 44. When the tool is lifted, the arm 50 is set, so that thereafter movement of the magnet 34 toward the member 24 will close the switch and energize the magnet.

The electromagnetic fishing tool herein is a self contained unit, conforming to drilling requirements and thus effects a direct saving in time in substitution for a bit at once there is trouble to be removed from the hole. The preferred type of cell is one which will not discharge the liquid therefrom when on its side. When the tool is out of the well, plug 58 (shown at the upper left of Fig. 2) is removed so there may not be an accumulation of gases in the housing 7 given off by the battery.

The single electromagnet tool embodies in one structure a full range for all fishing service and constitutes a small fishing equipment for a maximum service.

What is claimed and it is desired to secure by Letters Patent is:

1. A well drilling stem and a fishing tool having threaded engagement with the stem said fishing tool embodying a battery and an electromagnet.

2. A well drilling stem and a fishing tool directly engageable with the stem said fishing tool embodying a battery and an electromagnet.

3. A self-contained electromagnetic fishing tool embodying a battery and an electromagnet.

4. A fishing tool unit comprising an electromagnet providing a pick up face, a battery therefor, and a housing for the battery mounting the magnet.

5. An electromagnet fishing tool providing a pick-up face, hoisting means for the tool, a battery for the magnet a housing for the battery providing a mounting for the magnet, and a switch coacting between the battery and magnet for controlling energization of the magnet from the battery.

6. An electromagnet fishing tool providing a pick-up face, hoisting means for the tool, a battery for the magnet, means providing a mounting for the battery and magnet, and an enclosed switch coacting between the battery and magnet for controlling energization of the magnet from the battery.

7. An electromagnet fishing tool providing a pick-up face, hoisting means for the tool, a battery for the magnet, a housing for the battery, connecting means permitting movement of the magnet relative to the housing, and a switch for controlling energization of the magnet from the battery, said switch operable by said movement of the magnet relative to the housing.

8. An electromagnetic fishing tool comprising an electromagnet, provided with a pick up face, hoisting means for the magnet a switch, a mounting for the switch, means connecting the magnet for movement relative to the mounting, and connections effective on movement of the magnet relative to the mounting for operating the switch.

9. An electromagnetic fishing tool comprising an electromagnet, in alignment therewith a magnet carrying housing terminating at one end to provide a pick-up face for the magnet, a switch in said housing, means for opening said switch, and hoisting means for the tool.

10. An electromagnetic fishing tool comprising an electromagnetic tool, and in alignment therewith a battery including a plurality of cells, anchoring means for the cells, a casing for enclosing the anchoring means, and hoisting means for the fishing tool.

11. An electromagnetic fishing tool comprising an electromagnetic tool, and in alignment therewith a battery including a plurality of cells, a pair of guide rods providing shelves for the cells, and means for anchoring the cells on the shelves.

12. A fishing tool having a magnetic pole first member recessed at one terminal, and a second member attachably engaging in the recess of said first member, and providing a prong extension from said first member.

13. An electromagnet fishing tool having an engaging face depressed intermediately of its extent in providing a seat for engageing magnetizable articles.

14. A fishing tool embodying an electromagnet, a switch adjacent the tool, a housing in alignment with the magnet for the switch, and a hoisting line for the tool.

15. A fishing tool comprising an electromagnet, a battery for energizing the magnet, a housing for the battery, there being a vent for the battery in the housing, and hoisting means for the tool.

In witness whereof I affix my signature.

ARTHUR H. BRANDON.